(12) United States Patent
Bjerrum et al.

(10) Patent No.: US 6,346,186 B1
(45) Date of Patent: Feb. 12, 2002

(54) METHOD FOR ELECTROCHEMICAL PHOSPHATING OF METAL SURFACES

(75) Inventors: Niels Janniksen Bjerrum, Charlottenlund; Erik Christensen, Hellerup; Thomas Steenberg, Roskilde, all of (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/633,748

(22) Filed: Aug. 7, 2000

Related U.S. Application Data

(63) Continuation-in-part of application No. 09/242,762, filed as application No. PCT/DK97/00344 on Aug. 26, 1997, now abandoned.

(30) Foreign Application Priority Data

Aug. 29, 1996 (DK) .................................. 0910/96

(51) Int. Cl.$^7$ .............................................. C25D 11/36

(52) U.S. Cl. ........................ 205/318; 205/320; 205/198; 72/41; 72/46

(58) Field of Search ................................ 205/318, 320, 205/198; 72/41, 46

(56) References Cited

U.S. PATENT DOCUMENTS 4,874,480 A * 10/1989 Sonada et al. .............. 205/318

* cited by examiner

Primary Examiner—Kishor Mayekar
(74) Attorney, Agent, or Firm—Lee, Mann, Smith, McWilliams, Sweeney and Ohlson

(57) ABSTRACT

A method for electrochemical phosphating of metal surfaces, particularly stainless steel, in connection with cold forming of metal workpieces, which method provides the cold formed workpiece with a lubricant after phosphating, involves an electrochemical phosphating through a cathodic process applying an aqueous phosphating solution containing 0.5 to 100 g $Ca^{2+}$/l
0.5 to 100 g $Zn^{2+}$/l
5 to 100 g $PO_4^{3-}$/l
0 to 100 g $NO_3^-$/l
0 to 100 g $ClO_3^-$/l and
0 to 50 g $F^-$ or $Cl^-$/l by which the temperature of the solution is between 0 and 95° C., the pH-value of the solution is between 0.5 and 5, and the current density is between 0.1 and 250 mA/cm$^2$. This gives a good lubrication effect, a good adhesion to the metal surface, particularly stainless steel, and a more expedient texture than ordinary phosphating.

10 Claims, No Drawings

METHOD FOR ELECTROCHEMICAL PHOSPHATING OF METAL SURFACES

RELATED APPLICATION

This application is a continuation-in-part of copending U.S. patent application Ser. No. 09/242,762, filed Jun. 14, 1999 now abandoned, which is a 371 of PCT/DK97/00344, filed Aug. 26, 1997.

BACKGROUND OF THE INVENTION

The invention concerns a method for electrochemical phosphating of metal surfaces, particularly stainless steel, in connection with cold forming of metal workpieces, which method provides the cold formed workpiece with a lubricant after the phosphating, particularly molybdenum disulphide or sodium stearate. The invention also concerns the application of an aqueous phosphating solution with a method of the kind described above.

In connection with cold forming of metal workpieces, e.g. steel workpieces, it is known that a better result is obtained if the cold formed workpiece is provided with a lubricant. It could be a glass-based lubricant melting during the strong heat development, thus having a lubricating effect, c.f. e.g. EP 0 043 639 B1 describing electrophoretic application of a glaseous lubricant, in this case on a titanium workpiece, or the lubricant could be e.g. molybdenum disulphide or sodium stearate. To obtain a better adhesion of the lubricant on cold formed workpieces, a precoat is often added first.

Cold formed iron and standard steel workpieces are often provided with a precoat of zinc phosphate or zinc calcium phosphate, applied chemically during a pure immersion process, c.f. U.S. Pat. No. 4,517,029. This process is not used with stainless steel due to the increased corrosion resistance. Zinc phosphate can be applied on iron, standard steel and zinc-plated steel through an electrochemical process, c.f. e.g. EP 0 653 502 A2, however, this process is used for corrosion protection and proor paint.

Besides, it is Known from Journal of Materials Science 29, 949–953 (1994) to provide stainless steel with calcium hydrogen phosphate through a similar process when producing bio-implants.

Summing up, it can be stated that the state of the art shows an extensive use of lubrication of cold formed workpieces through immersion or dipping, whereas, to the best of our knowledge, electrochemical application has until now never been used for cold forming.

SUMMARY OF THE INVENTION

According to the invention, it has turned out that electrochemical phosphating of metal surfaces, particularly stainless steel, when cold forming metal workpieces, can be made with a good result, when a lubricant, as e.g. molybdenum disulphide or sodium stearate, is applied on the cold formed workpiece after the phosphating, when carrying through an electrochemical phosphating through a cathodic process using an aqueous phosphating solution containing:

0.5 to 100 g $Ca^{2+}$/l
0.5 to 100 g $Zn^{2+}$/l
5 to 100 g $PO_4^{3-}$/l
0 to 100 g $NO_3^-$/l
0 to 100 g $ClO_3^-$/l and
0 to 50 g $F^-$ or $Cl^-$/l with the ratio of $Ca^{++}/Zn^{++}$ being greater than 1, and where temperature of the solution is between 0 and 95° C., the pH-value of the solution is between 0.5 and 5, and the current density is between 0.1 and 250 $mA/cm^2$.

The addition of calcium to the phosphating solution involves some surprising improvements during precipitation, as calcium partly improves the initiation of the precipitation, partly provides a more dense layer than pure zinc phosphate. The improved initiation means that a lower current is required for the precipitation, and the increased density and thus the decreasing electrical conductivity of the precoat means that the process is less sensitive to the geometrical configuration of the workpiece to be phosphatised. Thus the coating of e.g. the inside of a cup is possible, without requiring a change of the geometrical configuration of the anode, which increases the applicability of the process substantially when compared with the known processes. Further, the addition of calcium gives a reduced friction when compared with pure zinc phosphate.

The invention also concerns the application of an aqueous phosphating solution 4 for electrochemical phosphating of metal surfaces, particularly stainless steel, by which the cold formed workpiece are provided with a lubricant after the phosphating, particularly molybdenum disulphide or sodium stearate.

DESCRIPTION OF THE PREFERRED EMBODIMENTS

The present invention enables precipitation of a phosphate layer having a thickness appropriate for cold forming, and additionally the applied addition of calcium causes an improvement of the precipitation initiation, improves the applicability of the process for workpieces having a complicated geometrical configuration, and reduces friction. Additionally, a polymer, when added, is incorporated in and thus improving the coating. Besides, the addition of $F^-$ gives a better adhesion, particularly to stainless steel surfaces, and thus a more expedient texture is obtained than with ordinary phosphating. $Cl^-$ can be used instead of $F^-$. The application of $NO_3^-$ and/or $ClO_3^-$ limits the formation of bubbles on the workpiece surface.

The following table shows a number of examples demonstrating a series of typical test results obtained by using the method according to the invention. The properties of the precipitated coatings are tested through cup pressing, by which a piston is pressed against the workpiece placed in a die or a holder. When measuring the piston pressure as a function of the cup height, the decomposition of the lubricant film can be registered as an increase in the piston pressure caused by increased friction. The maximum cup height is the one at which the piston pressure has increased to the same level as the static piston pressure when starting the cup pressing.

It appears from the table that a known procedure (c.f. examples 1 and 1a) at a temperature of 70° C., pulsating current and a pulse-pause relation of 0.25 and a duration of the coating process of 10 minutes will give a maximum cup height of 27 mm; the obtained layer is very porous, has a poor adhesion and often is "caked", i.e. in the form of flakes. The application of an aqueous phosphating solution with the method according to the invention, c.f. examples 4 to 6, enables applying the precoat at temperatures as low as 25° C., without requiring special equipment for pulsation of the current, i.e. pure DC, and for a much shorter time, approx. 3 minutes. Additionally, larger cup heights can be obtained, c.f. examples 5 and 6. The use of a water soluble polymer, c.f. example 6, for which an ordinary, commercially available polymer (polyethylene glycol in the form of PEG 1000) is used, will give a more robust coating.

The coating obtained in accordance with the invention is very tight and uniform, facilitates the handling of cold formed workpieces, and permits transport without risking that the coating falls off. The method according to the invention can also be used in connection with other processes than cold forming, e.g. for corrosion protection and provision of a substrate for paint.

Known prior art uses small amounts of calcium on an interchangeable basis with metals such as iron or nickel to regulate parameters in the bath. The invention of this application has recognized use of calcium for improving lubrication and precipitation. In accordance with the invention, it is not possible to use the same large amounts of iron or nickel instead of calcium, as this will cause the precipitation to be slow and also cause seizure during cold forming. The prior art has not recognized the unique property of calcium when used in large amounts.

Calcium is used as a main ingredient in the solution. As will be seen from examples 3 through 6 following, the calcium content in the aqueous solution is equal to or greater than the zinc content, which is a marked difference from conventional phosphatization. Thus, in accordance with the present invention, the relation of $Ca^{++}/Zn^{++}$ is greater than 1. The large calcium content in the solution results in the phosphate layer being precipitated on the workpiece with a high content of calcium. For example, calculated from example 5 following, the calcium is 23.9% by weight and the zinc is 25.6% by weight, or, expressed in $g/m^2$, 10.5 $g/m^2$ calcium and 11.3 $g/m^2$ zinc. The large calcium content in the surface coating gives a more dense layer than possible in conventional zinc phosphatization.

EXAMPLES with the ratio of $Ca^{++}/Zn^{++}$ being larger than 1, and where the temperature of the solution is between 0 and 95° C., the pH-value of the solution is between 0.5 and 5, and the current density is between 0.1 and 250 $mA/cm^2$, and then applying a lubricant to the workpiece.

2. Method according to claim 1 in which the lubricant comprises molybdenum disulphide or sodium stearate.

3. Method according to claim 1, in which the temperature of the solution is approx. 25° C., the pH-value is 1 to 4, and the current density is 5 to 250 $mA/cm^2$.

4. Method according to claim 1, in which the aqueous phosphating solution contains 10 to 20 g $Ca^{2+}$/l 2 to 10 g $Zn^{2+}$/l 30 to 90 g $PO_4^{3-}$/l 20 to 50 g $NO_3^-$/l 0 to 40 g $ClO_3^-$/l and 0 to 5 g $F^-$/l.

5. Method according to claim 1, in which the aqueous phosphating solution further contains 0 to 100 g of a water soluble polymer per litre.

6. Method according to claim 5 in which the water soluble polymer comprises at least one of polyvinyl alcohol, polyethylene glycol and polyethylene oxide.

7. A method of preparing a workpiece, comprising the steps of application of an aqueous phosphating solution as set forth in claim 1 for electrochemical phosphating of metal

|  | Example No. 1 (comp.) | Example No. 1a (comp.) | Example No. 2 (comp.) | Example No. 3 | Example No. 4 | Example No. 4a | Example No. 5 | Example No. 6 |
|---|---|---|---|---|---|---|---|---|
| $[F^-]$ | 0.02 M | 0.02 M | 0.02 M | 0.02 M | 0.02 M | 0.02 M | 0.02 M | 0 |
| $[Zn^{2+}]$ | 0.31 M | 0.31 M | 0 | 0.11 M | 0.06 M | 0.06 M | 0.06 M | 0.06 M |
| $[Ca^{2+}]$ | 0 | 0 | 0.44 M | 0.22 M | 0.43 M | 0.43 M | 0.43 M | 0.43 M |
| $[NO_3^-]$ | 0.62 M | 0.62 M | 1.09 M | 0.65 M | 0.57 M | 0.57 M | 0.57 M | 0.61 M |
| $[PO_4^{3-}]$ | 0.28 M | 0.28 M | 0.41 M | 0.23 M | 0.89 M | 0.89 M | 0.89 M | 0.33 M |
| $[ClO_3^-]$ | 0.20 M | 0.20 M | 0.32 M | 0.24 M | 0 | 0 | 0 | 0 |
| pH | 2 | 2 | 2 | 2 | 2 | 2 | 2 | 2 |
| [Polymer] | 0 | 0 | 0 | 0 | 0 | 0 | 0 | 20 g PEG 1000/1 |
| Current density | 45 $mA/cm^2$ | 45 $mA/cm^2$ | 45 $mA/cm^2$ | 72 $mA/cm^2$ | 43 $mA/cm^2$ | 72 $mA/cm^2$ | 72 $mA/cm^2$ | 30 $mA/cm^2$ |
| Pulsation | 0.5 s pulse 2 s pause | 0.5 s pulse 2 s pause | none | 0.5 s pulse 2 s pause | none | none | none | none |
| Time | 10 min. | 10 min. | 5 min. | 10 min. | 3 min. | 3 min. | 3 min. | 3 min. |
| Temperature | 70° C. | 70° C. | 25° C. | 70° C. | 25° C. | 25° C. | 25° C. | 25° C. |
| Workpiece material | stainless steel | stainless steel | stainless steel | stainless steel | stainless steel | stainless steel | stainless steel | stainless steel |
| Obtained layer thickness | 43 ± 9 $g/m^2$ | 43 ± 9 $g/m^2$ | 65 ± 7 $g/m^2$ | 47 ± 4 $g/m^2$ | 26 ± 7 $g/m^2$ | 44 ± 4 $g/m^2$ | 44 ± 4 $g/m^2$ | 42 ± 4 $g/m^2$ |
| Coating | $Zn_3(PO_4)_2$ | $Zn_3(PO_4)_2$ | $Ca_3(PO_4)_2$ | $Ca_{0.5}Zn_{2.5}(PO_4)_2$ | $Ca_2Zn(PO_4)_2$ | $Ca_2Zn(PO_4)_2$ | $Ca_2Zn(PO_4)_2$ | $Ca_{1.6}Zn_{1.4}(PO_4)_2$ |
| Lubricant | $MoS_2$ | Na-stearate | $MoS_2$ | $MoS_2$ | $MoS_2$ | $MoS_2$ | Na-stearate | Na-stearate |
| Lubricant layer thickness | 12 ± 2 | 27 ± 5 | 21 ± 5 | 20 ± 8 | 28 ± 5 | 36 ± 7 | 18 ± 4 | 21 ± 6 |
| Max. cup height (in mm) | 16.7 ± 2.7 | 27.0 ± 1 | 24.4 ± 2.3 | 20.2 ± 1.6 | 22.7 ± 1.3 | 26.9 ± 1.1 | >31.0 | >31.0 |

What is claimed is:

1. Method for electrochemical phosphating of metal surfaces used with cold forming of metal workpieces, comprising effecting an electrochemical phosphating through a cathodic process using an aqueous phosphating solution containing 0.5 to 100 g $Ca^{2+}$/l 0.5 to 100 g $Zn^{2+}$/l 5 to 100 g $PO_4^{3-}$/l 0 to 100 g $NO_3^-$/l 0 to 100 g $ClO_3^-$/l and 0 to 50 g $F^-$ or $Cl^-$/l surfaces of the metal workpiece, and then providing the workpiece to be cold formed with a lubricant after phosphating.

8. A method according to claim 7, in which the lubricant comprises molybdenum disulphide or sodium stearate.

9. A method according to claim 7, in which the phosphating solution further contains 0 to 100 g of a water soluble polymer per litre.

10. A method according to claim 9 in which the water soluble polymer comprises at least one of polyvinyl alcohol, polyethylene glycol and polyethylene oxide.

* * * * *